(12) United States Patent
Kopelke et al.

(10) Patent No.: US 10,430,969 B2
(45) Date of Patent: Oct. 1, 2019

(54) METHOD FOR RECOGNIZING OBJECTS IN A WAREHOUSE, AND INDUSTRIAL TRUCK WITH AN APPARATUS FOR RECOGNIZING OBJECTS IN A WAREHOUSE

(71) Applicant: Jungheinrich Aktiengesellschaft, Hamburg (DE)

(72) Inventors: Jan Kopelke, Hamburg (DE); Eckhard Schulz, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/794,147

(22) Filed: Oct. 26, 2017

(65) Prior Publication Data

US 2018/0114340 A1 Apr. 26, 2018

(30) Foreign Application Priority Data

Oct. 26, 2016 (DE) .......................... 10 2016 120 386

(51) Int. Cl.
*G06K 9/00* (2006.01)
*H04N 13/02* (2006.01)
(Continued)

(52) U.S. Cl.
CPC ............... *G06T 7/74* (2017.01); *B25J 9/1697* (2013.01); *B66F 9/063* (2013.01);
(Continued)

(58) Field of Classification Search
USPC ....... 382/100, 106, 143, 154, 155, 162, 168, 382/173, 181, 190, 199, 209, 24, 232,
(Continued)

(56) References Cited

U.S. PATENT DOCUMENTS 5,471,541 A 11/1995 Burtnyk et al.
2012/0250978 A1 10/2012 Taylor
(Continued)

FOREIGN PATENT DOCUMENTS

DE 102013002554 A1 8/2014
EP 2468678 A1 6/2012
EP 2767925 A2 8/2014

OTHER PUBLICATIONS

L. Baglivo et al.; "Autonomous pallet localization and picking for industrial forklifts: a robust range and look method"; Measurement Science and Technology 22; published Jul. 7, 2011; 11 pages.
(Continued)

*Primary Examiner* — Seyed H Azarian
(74) *Attorney, Agent, or Firm* — Barclay Damon LLP

(57) ABSTRACT

A method for recognizing a viewed object in a warehouse comprises detecting image data comprising a plurality of pixels with a 3D camera attached to an industrial truck, wherein information regarding a distance from the viewed object to the 3D camera is assigned to each pixel. Creating a two-dimensional data set by projecting the plurality of pixels on a projection plane and comparing the two-dimensional data set with a predefined pattern representing a reference object. Determining a provisional recognition of a viewed object at a position in the projection plane based on a correspondence found in the comparison. Creating a second data set that comprises a depth profile along a line at the position of the projection plane and comparing the second data set with a predefined depth profile pattern assigned to the reference object. The final recognition of the viewed object occurring when a correspondence is found in the comparison of the second data set with a predefined depth profile pattern assigned to the reference object.

13 Claims, 2 Drawing Sheets

(51) Int. Cl.
  *G06T 7/73* (2017.01)
  *G06T 1/00* (2006.01)
  *B25J 9/16* (2006.01)
  *B66F 9/06* (2006.01)
  *G06K 9/62* (2006.01)

(52) U.S. Cl.
  CPC ..... *G06K 9/00208* (2013.01); *G06K 9/00791* (2013.01); *G06K 9/6203* (2013.01); *G06T 1/0007* (2013.01); *G06K 2209/19* (2013.01); *G06T 2200/04* (2013.01); *G06T 2207/30108* (2013.01); *G06T 2207/30261* (2013.01)

(58) Field of Classification Search
  USPC ................ 382/254, 276, 285–291, 305, 312; 348/46; 700/300; 701/2
  See application file for complete search history.

(56) References Cited

U.S. PATENT DOCUMENTS

| | | | | |
|---|---|---|---|---|
| 2013/0096735 | A1* | 4/2013 | Byford | G05D 1/0231 701/2 |
| 2014/0232826 | A1* | 8/2014 | Halata | B66F 9/0755 348/46 |
| 2015/0347840 | A1* | 12/2015 | Iida | H04N 13/271 382/103 |
| 2016/0090285 | A1* | 3/2016 | Svensson | B66F 9/0755 700/300 |

OTHER PUBLICATIONS

EP3316181; May 2, 2018; European Search Report dated Mar. 22, 2018; 11 pages.

\* cited by examiner

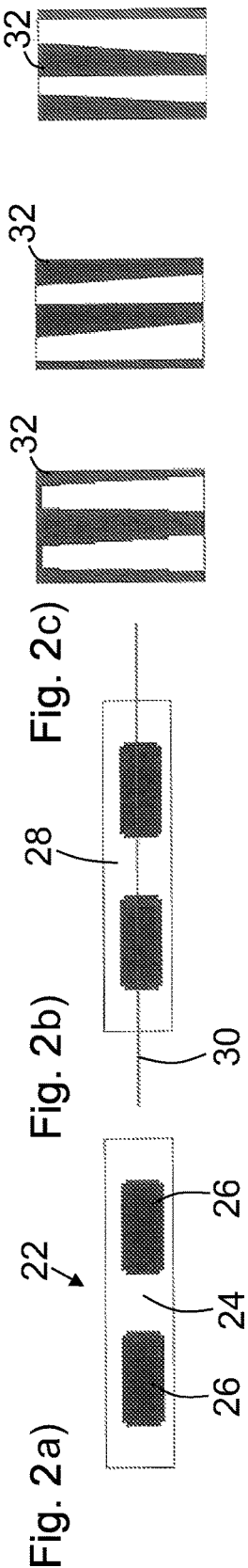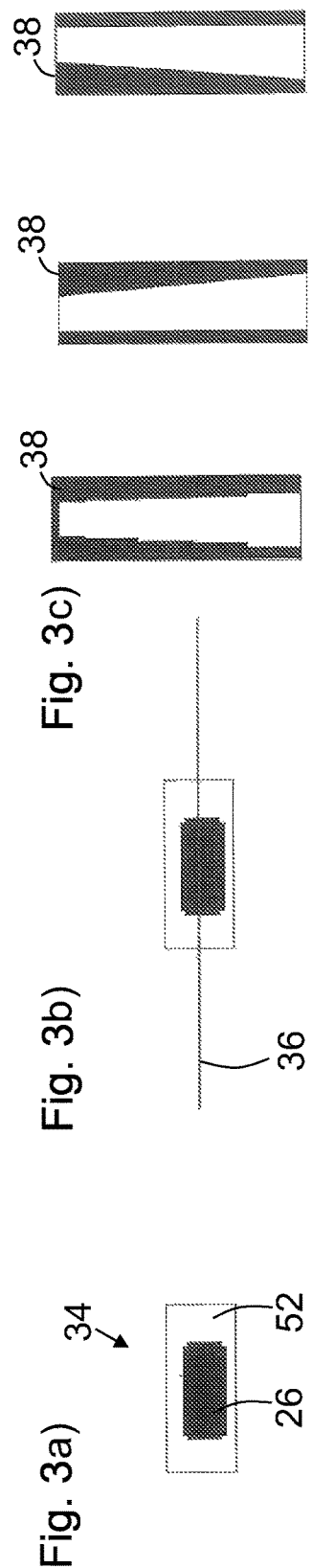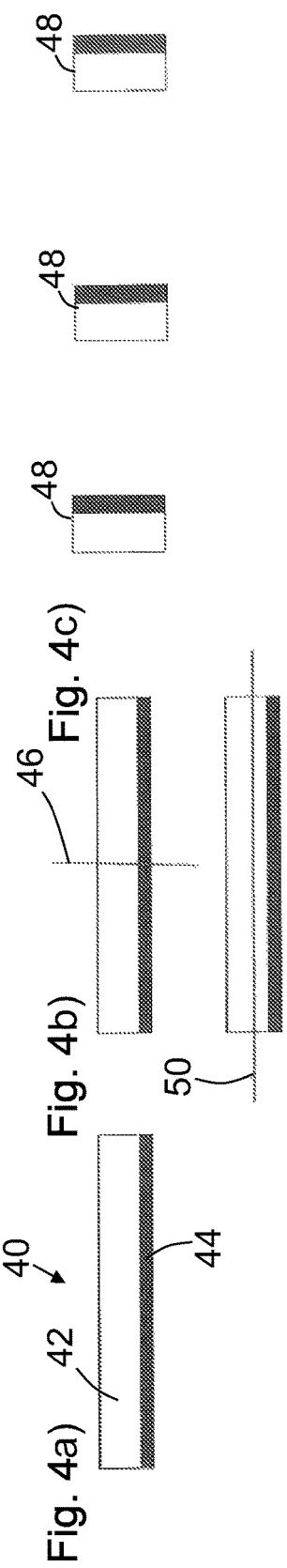

METHOD FOR RECOGNIZING OBJECTS IN A WAREHOUSE, AND INDUSTRIAL TRUCK WITH AN APPARATUS FOR RECOGNIZING OBJECTS IN A WAREHOUSE

CROSS REFERENCE TO RELATED INVENTION

This application is based upon and claims priority to, under relevant sections of 35 U.S.C. § 119, German Patent Application No. 10 2016 120 386.6, filed Oct. 26, 2016, the entire contents of which are hereby incorporated by reference.

BACKGROUND

The invention relates to a method for recognizing a viewed object in a warehouse in which image data is detected with a 3D camera attached to an industrial truck. The image data comprise a plurality of pixels that are each assigned distance information. A two-dimensional data set is created as the basis for the image data by projecting pixels on a projection plane. The two-dimensional data set is compared with a predefined pattern representing a reference object. If a correspondence is found in the comparison between the two-dimensional data set and the predefined pattern then the viewed object is recognized.

Such a method is disclosed in the document EP 2767925 A2. The known method is practical and can be used to simplify fully or partially-automated operation of an industrial truck, i.e., in driverless industrial trucks or as a driver assistance system. However, there is a need for a more precise and reliable recognition method.

BRIEF SUMMARY OF THE INVENTION

The invention provides a method for recognizing a viewed object in a warehouse and an industrial truck set up therefor, with which more precise and/or reliable recognition of a viewed object is possible.

The method comprises detecting image data with a three-dimensional or 3D camera attached to an industrial truck, wherein the image data comprise a plurality of pixels, and information regarding the distance of a viewed object to the 3D camera is assigned to each pixel. A a two-dimensional data set is then created by projecting pixels on a projection plane. The two-dimensional data set is compared with a predefined pattern representing a reference object. Provisional recognition of the viewed object at a position in the projection plane occurs when a correspondence is found in the comparison of the two-dimensional data set and the predefined pattern. A second data set is created that comprises a depth profile along a line at the position of the projection plane. This second data set is then compared with a predefined depth profile pattern assigned to the reference object, and final recognition of the viewed object occurs when a correspondence is found between the second data set and the predefined deth profile.

The 3D camera can be a time of flight camera. It can for example be attached to a load carrying means or load carriage of the industrial truck, in particular in or on a fork tip. The image data detected by the 3D camera form the basis for all additional steps. The image data can be updated one or more times while executing the method. In particular, the image data can be updated continuously.

In order to provisionally recognize a viewed object and determine its position, pixels are first projected on a projection plane. All of the pixels contained in the image data or only a part thereof can be projected, in particular all pixels that are contained in a spatial environment of the projection plane. In the method, the projection plane is preferably selected so that it corresponds to a suspected arrangement of the viewed objects to be recognized. For example, a main plane of a warehouse can be established as the projection plane with the assistance of a statistical evaluation of the image data as explained in the aforementioned document in detail. In one embodiment, the projection plane can be selected perpendicular to a viewing direction of the 3D camera when the industrial truck stands in front of a rack. Then the projection of the image data on the protection plane substantially consists of portraying all relevant pixels in a plane without considering the distance information.

In an embodiment, a template matching step compares the two-dimensional data set with a predefined pattern (template). For this, a correlation between the predefined pattern with the two-dimensional data set can be calculated in different relative arrangements. If a correspondence or likeness is determined, (i.e., a certain level of correspondence is exceeded) between the two-dimensional data set and the predefined pattern, then the viewed object is provisionally recognized at the relevant position of the projection plane. The level of correspondence required to determine a correspondence is selected so that it is exceeded when there is a sufficient probability that the detected image data at the relevant location show a viewed object corresponding to the predefined pattern of the reference object.

In an embodiment, a second template matching step is executed following the provisional recognition of a viewed object. For this, a second data set is created that comprises a depth profile along a line at the position of the projection plane in which the viewed object was provisionally recognized. In an embodiment, the line runs within the projection plane. The second data set can be a one-dimensional data set that contains depth information on each point of the line. However, a more comprehensive data set can also be used that contains depth information at the points of a plurality of adjacent lines. Depth information means in particular an absolute or relative distance of a pixel from the line, or respectively the projection plane. Then the second data set is compared with a predefined depth profile pattern (in other words with a second template). Only when a correspondence is determined in this comparison (i.e., a certain level of correspondence is exceeded) is the viewed object finally recognized. The level of correspondence required to determine a correspondence is selected so that it is exceeded when there is a sufficient probability that the detected depth profile at the relevant location originates from a viewed object that corresponds to the predefined depth profile pattern of the reference object. The recognized position of the viewed object can correspond to the position in the production plane determined in the first comparison step. However, by considering the second comparison step, a final position of the viewed object can also be determined that can differ from the provisional position determined in the first comparison step in particular in the depth position.

The second comparison step using a depth profile pattern can be termed a "depth validation". The reliability of viewed object recognition is significantly improved by the depth validation. In particular, this step prevents a viewed object from being incorrectly recognized when the projection of the image data on the protection plane only accidentally corresponds to the first given pattern even though a full analysis of the complete image data shows that it cannot be or does not correspond to the reference object.

A particular advantage of the method is that substantially the same algorithms can be used for the two comparison steps. The computational effort is therefore relatively small and the method can be easily implemented.

In one embodiment, the projection plane may be arranged at an unchanging or constant distance from a rack front. The arrangement of a rack front can be determined based on the image data detected by a 3D camera, such as based on a statistical evaluation as explained in the aforementioned document. The use of a rack front as the projection plane is particularly favorable in many cases because the viewed objects to be recognized, such as pallets or other load bearers or horizontal or vertical supports of the rack, are generally arranged in or close to the rack front.

In one embodiment, the line is arranged horizontally or vertically. The line can in principle have any desired orientation within the projection plane. A horizontal or vertical arrangement can simplify the evaluation. In addition, many viewed objects to be recognized manifest a particularly characteristic depth profile, particularly in these spatial directions.

In one embodiment, a plurality of depth profile patterns are assigned to a reference object that each indicate a depth profile of the reference object from a given perspective of the reference object. The comparison of the additional data set is performed with the depth profile pattern with a perspective of the reference object that corresponds to a viewing direction of the 3D camera when detecting the image data on the projection plane. Since the projection plane is generally calculated based on the image data detected by the 3D camera, the angle between the viewing direction of the 3D camera to the projection plane is known. This influences the depth information detected by the 3D camera about the viewed objects to be recognized. It is therefore recommendable to use depth profile patterns in the second template matching step that have a very similar, ideally equivalent perspective of the viewed object.

In one embodiment, a first predefined pattern that corresponds to a view of the entire reference object, and a second predefined pattern that corresponds to a characteristic section of the reference object are available for a specific reference object. Such a use of a plurality of predefined patterns for a specific reference object can improve or even enable the precision of determining the position in the first template matching step. This holds true when a viewed object to be recognized in the image region detected by the 3D camera is only sectionally recognizable, for example when a pallet to be recognized is already right in front of the load carrying means.

In one embodiment, the two-dimensional data set is compared with the first predefined pattern at a first distance between the 3D camera and projection plane, and with the second predefined pattern at a second distance between the 3D camera and projection plane. Such a change of the predefined pattern that is used depending on the distance can lead to a particularly precise determination of position and reliable viewed object recognition, for example when approaching a viewed object to be picked up by a load carrying means after a given distance is undershot.

In one embodiment, the first predefined pattern represents a pallet, and the second predefined pattern represents a pallet opening. A pallet opening designates the region of a pallet in which a load carrying means, in particular a single fork, is inserted. When a pallet opening is used as the predefined pattern, the relevant position for inserting the load carrying means can be determined with particular precision.

In one embodiment, the predefined pattern represents a horizontal support and consists of a horizontal, rectangular area and a rectangular space arranged therebelow. A height of the horizontal rectangular area can in particular correspond to a height of a horizontal support or be lower than this height. This selection of the predefined pattern takes into account the fact that a space remains below a horizontal support in typical warehouses even when a storage space located thereunder is occupied, whereas frequently a load is arranged directly above the horizontal support. To reliably recognize a horizontal support, it is therefore recommendable to include the space below the horizontal support, but not a region above the horizontal support, in the predefined pattern.

In one embodiment, the additional data set may have a depth profile along a vertical line that is compared with a depth profile pattern of a horizontal support. The depth profile of a horizontal support along a vertical line is particularly characteristic and therefore ideal for recognition.

In one embodiment, a depth profile along a horizontal line is investigated for jumps before the final recognition of a horizontal support. If the depth profile is not free of jumps, it is generally not a horizontal support. By the additional review step, a faulty recognition of a horizontal support can therefore be avoided.

In another embodiment, an industrial truck has an apparatus for recognizing a viewed object in a warehouse, wherein the apparatus has a 3D camera and an evaluation apparatus, and wherein the 3D camera is attached to the industrial truck and is equipped to detect image data, and the image data comprise a plurality of pixels that are each assigned distance information. The evaluation apparatus is configured to create a two-dimensional data set by projecting pixels on a projection plane and compare the two-dimensional data set with a predefined pattern representing a reference object. Provisional recognition of a viewed object at a position in the projection plane occurs when a correspondence is found in the comparison between the two-dimensional data set and the predefined pattern. Another data set is created that comprises a depth profile along a line at the position of the projection plane. The evaluation apparatus then compares this other data set with a predefined depth profile pattern assigned to the reference object and final recognition of the viewed object occurs when a correspondence is found in this comparison.

With regard to the features and advantages of the industrial truck, reference is made to the above explanations of the method which correspondingly apply.

BRIEF DESCRIPTION OF THE DRAWINGS

The invention is explained in greater detail below based on exemplary embodiments shown in figures. In the following:

FIG. 2a illustrates a predefined pattern of a pallet;

FIG. 2b illustrates a depth profile of the predefined pattern of FIG. 2a;

FIG. 2c illustrates another depth profile of the predefined pattern of FIG. 2a;

FIG. 3a illustrates another predefined pattern of a pallet;

FIG. 3b illustrates a depth profile of the predefined pattern of FIG. 3a;

FIG. 3c illustrates another depth profile of the predefined pattern of FIG. 3a;

FIG. 4a illustrates a predefined pattern of a pallet;

FIG. 4b illustrates a depth profile of the predefined pattern of FIG. 4a; and

FIG. 4c illustrates another depth profile of the predefined pattern of FIG. 4a.

DETAILED DESCRIPTION OF THE INVENTION

Figure 1:
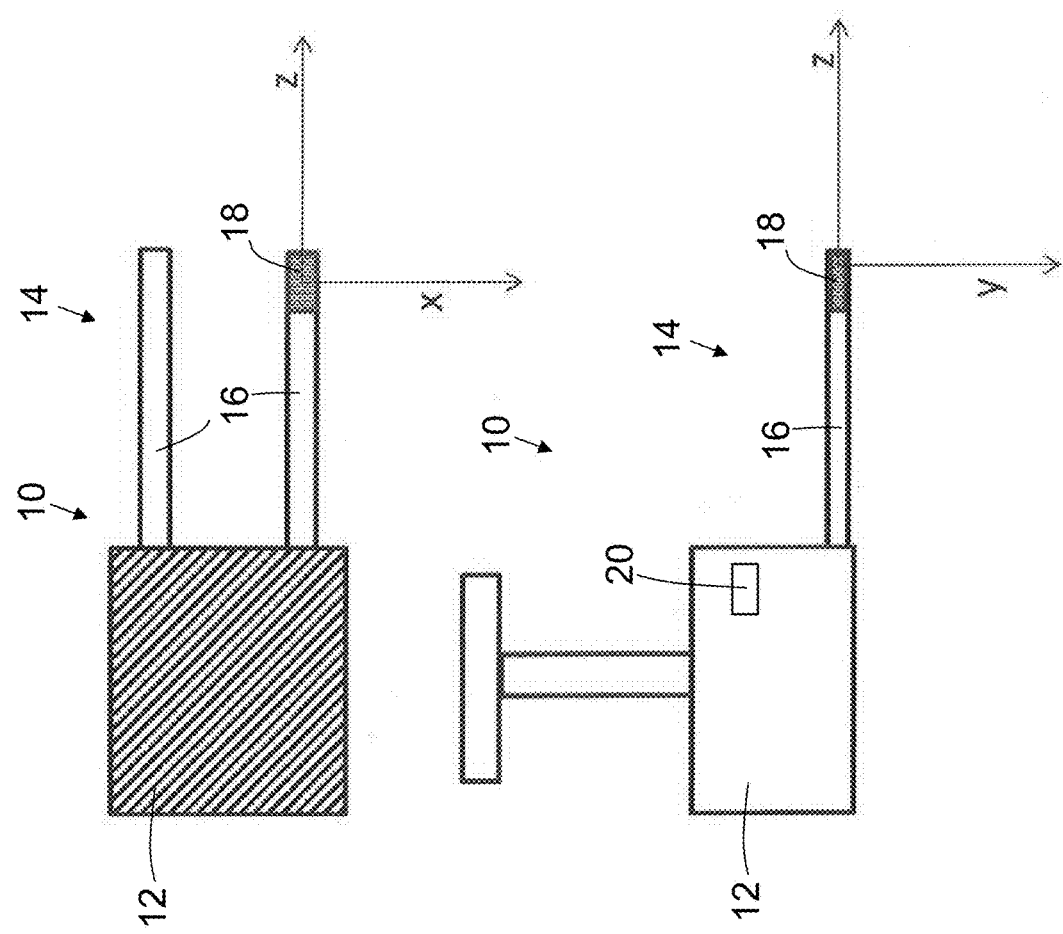
FIG. 1 illustrates a schematic representation of the top and bottom of an embodiment of an industrial truck.

FIGS. 2a, 3a, and 4a show a predefined pattern. FIGS. 2b, 3b, and 4b illustrate the formation of a depth profile and FIGS. 2c, 3c, and 4c show depth profile patterns assigned to three different perspectives.

FIG. 1 shows an industrial truck 10 according to the invention in a view from above (the top part of FIG. 1) and in a view from the side (the bottom part of FIG. 1). The industrial truck 10 has a drive part 12 and a load part 14. The load part 14 has two forks 16 of a load carrying means (not shown). A schematically indicated three-dimensional or 3D camera 18 is arranged in the tip of one of the forks 16.

The 3D camera 18 is configured to detect image data of a region in front of the fork 16. The viewing direction of the 3D camera 18 in FIG. 1 runs in the Z direction of the drawn coordinate system (i.e., along a main direction of travel of the industrial truck 10). The X-axis of the coordinate system to which the image data detected by the 3D camera 18 refers runs from the tip of the fork 16 in the horizontal direction to the right, and the Y-axis runs from the tip of the fork 16 downward in a vertical direction. In the drive part 12 of the industrial truck 10, an evaluation apparatus 20 is arranged that is only indicated in the bottom part of FIG. 1.

FIG. 2a indicates a predefined pattern 22 that represents a pallet. The predefined pattern 22 has a light area 24 that corresponds to a face of the pallet, and two darker rectangular areas 26 symmetrically arranged within the area 24 that correspond to both openings in the pallet. In the method according to the invention, the predefined pattern 22 is compared with a two-dimensional data set that was created based on the image data detected by the 3D camera 18 by projecting pixels on a projection plane.

FIG. 2b shows a section 28 from the two-dimensional data set for which a correspondence with the predefined pattern 22 was discerned. In the projected image data, one can recognize the characteristic features of a pallet as explained with regard to the associated predefined pattern 22.

In the next step of the method, a depth profile is created along a horizontal line 30 drawn in FIG. 2b. For each point of the horizontal line 30, the depth profile contains depth information detected by the 3D camera 18 while detecting the image data that was also based on the two-dimensional data set.

The depth profile determined in this manner is compared in another method step with a predefined depth profile pattern 32 assigned to the pallet. In this regard, FIG. 2c shows three adjacent, predefined depth profile patterns 32 that each correspond to a slightly different direction of viewing the reference object, in this case a pallet. The far left illustration of FIG. 2c is a depth profile pattern 32 belonging to a pallet that results when the viewing direction is precisely in front of the face of the pallet. The middle illustration of FIG. 2c shows another depth profile pattern 32 of a pallet that is perceived when the direction of viewing the pallet is rotated slightly counterclockwise. The far right illustration of FIG. 2c is a third depth profile pattern 32 of the pallet when the viewing direction is rotated slightly clockwise.

For comparing the other data set, or respectively the depth profile contained therein, with a depth profile pattern 32, the depth profile pattern 32 is used whose viewing direction corresponds to the direction of the 3D camera 18 of viewing the projection plane. If the image data has been detected with a viewing direction angled slightly relative to the face of a pallet, the comparison is performed with a depth profile pattern 32 that corresponds to a view of an ideal pallet from the same viewing direction in the depth validation.

FIG. 3a shows another predefined pattern 34 that portrays a section of a pallet in which a dark, rectangular area 26 represents a pallet opening, and a light rectangular ring 52 surrounding the rectangular area 26 on all sides represents a part of the face of a pallet. The predefined pattern 34 is used in the method according to the invention when the detected image data no longer show the entire pallet, in particular due to a slight distance from pallet, but only a section thereof. If a correspondence with the predefined pattern 34 is discerned in the image data, a depth profile, portrayed in FIG. 3b, is created in the next step along a horizontal line 36 and made accessible in another data set. This is followed by a comparison with a predefined depth profile pattern 38 of a pallet opening. Three examples from different perspectives are portrayed in FIG. 3c. They basically differ from the depth profile patterns 32 portrayed in FIG. 2c of the entire pallet in that they only comprise a pallet opening and sections of a pallet face directly laterally adjacent thereto.

FIG. 4a shows a predefined pattern 40 that represents horizontal support such as a horizontal support of a high rack. It consists of a horizontal, rectangular area 42 that represents the extension of the horizontal support, and a darker rectangular area 44 depicted therebelow in FIG. 4a that represents a space below the horizontal support.

The top illustration of FIG. 4b portrays how a depth profile is created when a horizontal support is provisionally recognized with the assistance of the predefined pattern 40 in the data projected on a projection plane, for example, along a vertical line 46.

This depth profile, or another data set including this depth profile, is compared in the next step with a depth profile pattern 48 portrayed in FIG. 4c. The three depth profile patterns 48 in FIG. 4c differ in terms of their perspective which is, however, less apparent than in FIGS. 2c and 3c due to the simpler structure.

In the bottom illustration of FIG. 4b shows how a depth profile is created along a horizontal line 50 in an additional method step when recognizing a horizontal support. This is not compared with a corresponding depth profile pattern and is only checked for jumps in the depth information. If jumps occur, it is an argument against identifying the corresponding image region as a support. If the depth information along line 50 has a continuous extension, it contrastingly indicates a horizontal support.

The invention claimed is:

1. A method for recognizing a viewed object in a warehouse, the method comprising:
    detecting image data of the viewed object with a 3D camera attached to an industrial truck, the image data comprising a plurality of pixels, wherein distance information from the viewed object to the 3D camera is assigned to each pixel;
    creating a two-dimensional data set by projecting the plurality of pixels on a projection plane;
    comparing the two-dimensional data set with a predefined pattern representing a reference object;
    determining a provisional recognition of the viewed object at a position in the projection plane based on a correspondence found in the comparison of the two-dimensional data set with the predefined pattern representing the reference object;

creating a second data set that comprises a depth profile along a line at the position of the projection plane; and comparing the second data set with a predefined depth profile pattern assigned to the reference object, wherein final recognition of the viewed object occurs when a correspondence is found in the comparison of the second data set with a predefined depth profile pattern assigned to the reference object, wherein the image data detected by the 3D camera is updated continuously.

2. The method according to claim 1, wherein the projection plane is disposed at a constant distance from a rack front.

3. The method according to claim 1, wherein the line is disposed horizontally.

4. The method according to claim 1, wherein the line is disposed vertically.

5. The method according to claim 1, further comprising a plurality of depth profile patterns assigned to the reference object that indicate a depth profile of the reference object from a given perspective of the reference object.

6. The method according to claim 5, wherein the comparison of the second data set is performed with the depth profile pattern with the given perspective of the reference object that corresponds to a viewing direction of the 3D camera when detecting the image data on the projection plane.

7. A method for recognizing a viewed object in a warehouse, the method comprising:

detecting image data of the viewed object with a 3D camera attached to an industrial truck, the image data comprising a plurality of pixels, wherein distance information from the viewed object to the 3D camera is assigned to each pixel, and wherein the image data detected by the 3D camera is updated continuously;

creating a two-dimensional data set by projecting the plurality of pixels on a projection plane;

comparing the two-dimensional data set with a view of the reference object in its entirety at a first distance between the 3camera and projection plane;

comparing the two-dimensional data set to a depth profile corresponding to a section of the reference object at a second distance between the 3D camera and projection plane;

determining a provisional recognition of the viewed object at a position in the projection plane based on a correspondence found in the comparison of the two-dimensional data set;

creating a second data set that comprises a depth profile along a line at the position of the projection plane; and comparing the second data set with a predefined depth profile pattern assigned to the reference object, wherein final recognition of the viewed object occurs when a correspondence is found in the comparison of the second data set with a predefined depth profile pattern assigned to the reference object.

8. The method according to claim 7, wherein the first predefined pattern represents a pallet and the second predefined pattern represents a pallet opening.

9. The method according to claim 7, wherein the predefined pattern represents a horizontal support and comprises a rectangular area disposed above a rectangular space.

10. The method according to claim 9, wherein the second data set has a depth profile along a vertical line that is compared with a depth profile pattern of a horizontal support.

11. The method according to claim 7, further comprising investigating a depth profile along a horizontal line for jumps before the final recognition of a horizontal support.

12. An industrial truck having a recognition apparatus comprising a 3D camera attached to the industrial truck and configured to detect image data, and an evaluation apparatus, the recognition apparatus configured to execute a method for recognizing a viewed object in a warehouse, the method comprising:

creating a two-dimensional data set by projecting pixels on a projection plane;

comparing the two-dimensional data set with a predefined pattern representing a reference object, wherein provisional recognition of the viewed object at a position in the projection plane occurs when a correspondence is found in the comparison between the two-dimensional data set and the predefined pattern representing the reference object;

creating a second data set comprising a depth profile along a line at the position of the projection plane; and comparing the second data set with a predefined depth profile pattern assigned to the reference object, wherein final recognition of the viewed object occurs when a correspondence is found in the comparison of the second data set with a predefined depth profile pattern assigned to the reference object, wherein the image data detected by the 3D camera is updated continuously.

13. The industrial truck according to claim 12, wherein the 3D camera is configured to detect image data comprised of a plurality of pixels that are each assigned distance information.

* * * * *

UNITED STATES PATENT AND TRADEMARK OFFICE
CERTIFICATE OF CORRECTION

PATENT NO. : 10,430,969 B2
APPLICATION NO. : 15/794147
DATED : October 1, 2019
INVENTOR(S) : Jan Kopelke and Eckhard Schulz It is certified that error appears in the above-identified patent and that said Letters Patent is hereby corrected as shown below:

In the Claims

Claim 7:
Column 7
Line 43, change "3camera" to --3D Camera--

Signed and Sealed this
Twenty-fourth Day of November, 2020

Andrei Iancu
*Director of the United States Patent and Trademark Office*